United States Patent [19]

Ito

[11] Patent Number: 6,078,285
[45] Date of Patent: Jun. 20, 2000

[54] SURVEY APPARATUS AND SURVEY METHOD

[75] Inventor: Yasuhiro Ito, Hiratuka, Japan

[73] Assignee: Nikon Corporation, Tokyo, Japan

[21] Appl. No.: 09/100,240

[22] Filed: Jun. 19, 1998

[30] Foreign Application Priority Data

Jun. 19, 1997 [JP] Japan ................................. 9-162202

[51] Int. Cl.[7] .................................................... G01S 5/02
[52] U.S. Cl. ..................................... 342/357.17; 701/213
[58] Field of Search ......................... 342/357.08, 357.17; 701/213

[56] References Cited

U.S. PATENT DOCUMENTS

| | | |
|---|---|---|
| 5,077,557 | 12/1991 | Ingensand . |
| 5,233,357 | 8/1993 | Ingensand et al. . |
| 5,471,218 | 11/1995 | Talbot et al. ............................. 342/357 |
| 5,734,348 | 3/1998 | Aoki et al. ............................... 342/357 |
| 5,760,909 | 6/1998 | Nichols .................................. 356/4.08 |
| 5,821,900 | 10/1998 | Kishimoto ............................... 342/357 |

FOREIGN PATENT DOCUMENTS

19635591  3/1997  Germany .

*Primary Examiner*—Mark Hellner
*Attorney, Agent, or Firm*—Pillsbury Madison & Sutro LLP

[57] ABSTRACT

An angle and distance measuring apparatus having a built-in microcomputer is combined with a GPS survey machine so as to form a survey apparatus. The GPS survey machine measures the position of the survey apparatus by real time and obtains the values of coordinates defining the position of the survey apparatus. The angle and distance measuring apparatus creates and stores observation data in performing a survey. The microcomputer then stores the values of the measured coordinates as installation point information for observation data. Whenever the observation data is analyzed, the installation point of the survey apparatus can be confirmed. Thus, the survey result is easily evaluated and judged. As a result, based on the correct observation data, a highly reliable survey result is produced.

8 Claims, 3 Drawing Sheets

SURVEY APPARATUS AND SURVEY METHOD

BACKGROUND OF THE INVENTION

1. Field of Invention

The present invention relates to a survey apparatus in which an angle and distance measuring apparatus and a GPS survey machine are combined, and a survey method for using this survey apparatus.

2. Description of Related Art

Angle and distance measuring apparatus, a so-called "total station", is often used for a survey in civil engineering and construction work, and other surveys. This total station is a high performance angle and distance measuring apparatus in which a main microcomputer and multiple auxiliary microcomputers are installed in combination. This angle and distance measuring apparatus maintains a horizontal-rotation axis vertical, and a vertical-rotation axis horizontal, using a leveling table. Thus, this angle and distance measuring apparatus is able to measure with a high degree of accuracy horizontal direction angles about the horizontal-rotation axis and vertical direction angles about the vertical-rotation axis of a collimation telescope. In addition, this angle and distance measuring apparatus is able to measure with a high degree of accuracy the distance to a collimated target by performing a light wave measurement using a high luminance LED or the like.

This total station is installed on the vertical line above a survey point using a tripod. Then other survey points are collimated and measured from this survey point using the collimation telescope. This total station measures the horizontal direction angle from the reference direction to the collimation object survey point, and the vertical direction angle of the collimation object survey point with respect to the horizontal direction using a rotary encoder or the like. A pulse signal emitted from the rotary encoder is supplied to an angle measuring sub-CPU, which serves as an angle measuring microcomputer. The angle measuring CPU processes the pulse signal, and stores the angle data in the horizontal direction and the angle data in the vertical direction in its memory. In addition, this total station generates light waves using the high luminance LED, and projects the light waves onto the collimation point that has been collimated using the collimation telescope. When the light waves are reflected at the collimation point, a distance measuring sub-CPU, which serves as a distance measuring microcomputer, analyzes the reflected light, and stores in its memory the data on the distance to the collimation point.

When this total station, which is used for a collimation survey, receives commands from the keyboard, the main CPU, which serves as the main microcomputer, controls a display unit 31 so as to display on its display screen the angle data and distance data stored in the angle measuring microcomputer and the distance measuring microcomputer, respectively. The total station then transfers the respective data to an externally connected personal computer as needed.

In recent years, various kinds of surveys have been performed with the use of a global positioning system (GPS). In conducting a GPS survey, a receiving antenna and a receiver are used to receive radio waves from multiple GPS satellites. The received data is then stored in a memory built in the receiver or a flexible disk or a cassette tape, or the like. The received data is analyzed and the values of the coordinates of the position of the receiving antenna are calculated.

In storing in a memory or the like the data the GPS antenna has received, a file for storing the observation data to be received is created and is given a name before the reception of the observation data is started. This file is stored in a memory or the like. In a single positioning GPS survey, a single receiving antenna is used to measure the coordinates of the position of the receiving antenna. In a relative positioning GPS survey, several receiving antennas are used to measure the coordinates of the position of each of the receiving antennas. In a single GPS survey, a real time coordinate measurement is possible. However, in this case, the measurement error sometimes exceeds several tens of meters. For this reason, a single GPS survey is not currently in use. There are relative survey methods of various degrees of accuracy. For example, in a relative positioning GPS survey, called DGPS, each of the several receiving antennas performs a single positioning GPS survey. The coordinates of the position of each of the receiving antennas are measured based on the observation data received by the other receiving antennas. In this DGPS, when the coordinates of each receiving antenna are analyzed, if the exact position of at least one of the receiving antennas is known, the difference between the coordinates of the position of the receiving antenna, which the DGPS has obtained by analyzing the received data, and the coordinates of the receiving antenna installed at a known coordinate is calculated. In DGPS, this difference is used as a correction value for correcting the coordinate value of each of the receiving antennas that has been obtained by single positioning. By performing this correction, the DGPS can measure by real time the position of each of the other receiving antennas that the DGPS has simultaneously obtained by single positioning. In this case, the range of error of the measurement lies within several meters. In the real time kinematic GPS positioning method, which is a kind of relative GPS positioning method, data received by several receiving antennas is analyzed together. According to the real time kinematic GPS positioning method, the coordinate position of each of the receivers can be measured within an error margin of several centimeters. In the static GPS positioning method, several receiving antennas need to receive radio waves continuously from a satellite for a prescribed length of time. However, the static GPS positioning method is able to reduce the measurement error to less than one centimeter.

Therefore, the real time kinematic GPS and static GPS are currently in use for surveys. In using the relative GPS, when the coordinates of the position of each of the receiving antennas, which is a GPS antenna, are measured, the absolute error exists between the true coordinate values, which are true values of the coordinates of each the receiving antennas, and the measured coordinate values of the receiving antenna. Therefore, the values of the measurement result contain an error of large magnitude when the distances between the GPS antennas are small. On the other hand, when the distances between the GPS antennas are large, the measurement error can be made very small. In this case, the GPS survey can be performed with a high degree of accuracy.

For this reason, today, in surveying between visually recognizable survey points that are located within a relatively short distance, a collimation survey is performed, in which an angle and distance measuring apparatus such as the above-mentioned total station is used. A GPS survey is often used when the survey points are separated by distances that are too long to be visually recognized. For example, in the case in which a new reference point is installed, when no reference point whose exact coordinates are known exists nearby, a GPS survey is used so as to install this new reference point at the exact coordinate position.

In performing a survey that uses a GPS or the above-described angle anddistance measuring apparatus, the position of a new survey point is first determined approximately on the topographical map. A work plan that suits the survey object is then made. In making this work plan, a reconnaissance diagram is constructed on the topographical map. The reconnaissance diagram is constituted of required survey points that are determined approximately on the topographical map so as to suit the objective. The required number of the survey points and the positions of the survey points are determined with reference to an average plan diagram so as to complete the reconnaissance map. The average plan diagram that is used in this case shows a polygonal net. Using this polygonal net, the error contained in the distance between the survey points can be corrected by the net average, enabling easy calculation of the exact survey point coordinates.

Next, based on the completed reconnaissance diagram, a reconnaissance work is carried out. In this reconnaissance work, known survey points that are usable on the survey sites and the positions of new survey points are selected. A permanent sign or temporary sign is then installed at each of the new survey points. By investigating the sites, the positions of the survey points on the average plan diagram are modified so that they will suit the conditions on the sites. This modified average plan diagram is then used as an average diagram.

In addition, in a collimation survey, in which an angle anddistance measuring apparatus is used, an observation diagram is constructed. The observation diagram is constructed based on the reconnaissance diagram and average diagram so as to determine survey points at which the angle and distance measuring apparatus is to be installed and so as to determine which of the survey points are to be observed by collimation from the installed angle anddistance measuring apparatus. Based on this observation diagram, an observation execution plan is determined including the work process such as the order of observation. After this, survey work is carried out based on this observation execution plan. In the survey work, in accordance with the order of observation, the angle anddistance measuring apparatus is first installed at the first survey point, where a survey sign is installed. At the other survey points, at each of which a survey sign is installed, for example, a corner cube prism or the like is installed on the vertical line above the respective survey point. The corner cube prism is used to measure the horizontal direction angle, vertical direction angle, and straight line distance from the angle anddistance measuring apparatus to the corner cube prism. When these quantities have been measured, the obtained observation data is recorded.

In obtaining and recording this observation data, the machine type of the survey apparatus and the names of the observers are also recorded as part of the data. The observation data includes: (1) the name of the work, (2) the machine type of the survey apparatus and the machine number, (3) the names of the observers and the year, month, and day of the observation, (4) the weather, wind force, temperature, and atmospheric pressure on the observation day, (5) the names of the survey point at which the survey apparatus has been installed and remarks including the sign numbers, the height of the installed survey apparatus, the offset direction and offset distance from the survey sign to the survey apparatus, the pair count, that is the required number of times to conduct the measurement, the set number, the direction number, the start time and the end time, (6) the names of the collimation points, the heights of the objects, the observation number, the observed value of the horizontal angle, the observed value of the vertical angle, and the measured value of the oblique distance. The observation data is listed and recorded in the above-described order.

In obtaining and recording this observation data, the machine type and machine number of the survey apparatus are recorded in the main microcomputer that is built in the total station and are copied as observation data on the memory by a key operation on the keyboard. When a collimation point is collimated using the collimation telescope by the "save" operation on the keyboard, the observed values of the angle and distance are recorded as observation data in the angle measuring microcomputer and distance measuring microcomputer, respectively.

However, the other observation data is individually input and recorded by typing numbers and letters on the keyboard. When the observation of one collimation point is finished, the name of the next collimation point as input data is typed on the keyboard. The height of the object and the observation number of the collimation point having this collimation point name are then input from the keyboard. The next collimation point is collimated using the collimation telescope. The observed values of the horizontal angle, vertical angle, and oblique distance are saved by the required number of times. The collimation point name, height of the object, observation number, observed values of the horizontal angle, vertical angle and oblique distance are sequentially stored and recorded in the memory, in this order.

When the installation position of the total station has been changed, the survey point name, remarks, installation height, offset distance and the like are input from the keyboard, and are saved in the memory. Then the observation is continued. After the survey work on the site is finished, the above-described observation data is usually taken back to the office where the observation data is automatically processed and analyzed using a computer in which after-process software is installed. Based on the analyzed observation data, the survey result is recorded as a document.

Today, as has been described above, in conducting an observation survey between visually recognizable survey points that are located within a relatively short distance, an angle and distance measuring apparatus such as the total station is usually used. A GPS survey is often used when the survey points are separated by a long distance. However, when there is no known point, the exact coordinates of which are known, among the group of survey points, or when a known point to be used as a reference point, the exact coordinates of which are known, does not exist near the group of survey points, a GPS survey using a GPS survey machine is combined with a collimation survey using an angle anddistance measuring apparatus.

For this reason, a plan to use a survey apparatus in which an angle anddistance measuring apparatus and a GPS survey machine are combined by attaching a GPS antenna to the angle anddistance measuring apparatus, such as a total station, is proposed. However, as has been explained before, in order to conduct a GPS survey with a high degree of accuracy, the data received by the GPS antenna at the site needs to be combined with the data received by the other GPS antennas located at remote locations. Therefore, the data received by the GPS antenna attached to the angle anddistance measuring apparatus is combined with the data received by the other GPS survey machines so as to calculate the installation coordinates of the survey apparatus at the site. The observation data obtained by a collimation survey using the angle anddistance measuring apparatus is analyzed and is used to calculate the position of the survey point. Based on this analyzed observation data, the topography of the site is obtained. The installation coordinates of the survey apparatus, which has been obtained by analyzing the data received by the GPS antennas, is combined with the observation data that has been obtained by using the angle anddistance measuring apparatus. The result of the survey is summarized in this way.

As has been explained before, in conducting a survey between visually recognizable survey points, a collimation survey is often conducted with the use of an angle and distance measuring apparatus such as a total station. In conducting a collimation survey, the survey point names, which constitute important data, are manually input from the keyboard. Therefore, a human error can occur while typing the survey point names. When this input data containing an input error is analyzed, the data analysis is often disabled due to the error in the data. If the correct survey point names are found by comparing the input data with the work plan, the observation data is corrected, and the corrected observation data is analyzed and calculated again. In this way, the correct observation result is obtained.

However, when the survey point names are sequentially confirmed based on the observation execution plan, and the data analysis calculation is repeated after the survey point names that contradict the survey point names listed on the observation execution plan have been corrected, the reliability of the survey result deteriorates. In addition, when a wrongly input survey name happens to coincide with the name of another survey point, this error cannot be detected immediately. In this case, the data analysis calculation produces a wrong result.

Thus, in a collimation survey that uses an angle and distance measuring apparatus, it is not always possible to obtain a correct survey result no matter how carefully and precisely the collimation work is conducted, since a human error can occur in inputting survey point names. Moreover, when the angle and distance measuring apparatus is installed at a wrong installation point, the observed data cannot be used to analyze the survey result or the survey result does not fit in the admissible range of error. In such a case, the survey needs to be repeated.

In re-conducting a survey, when the survey site is in a remote location, or when the transportation to the survey site is inconvenient, an enormous amount of time is needed in order to commute to the site, in addition to the time and effort required to re-conduct the survey work.

U.S. Pat. No. 5,077,557—Ingensand entitled SURVEYING INSTRUMENT WITH RECEIVER FOR SATELLITE POSITION-MEASURING SYSTEM AND METHOD OF OPERATION and U.S. Pat. No. 5,233,357—Ingensand et al entitled SURVEYING SYSTEM INCLUDING AN ELECTRO-OPTIC TOTAL STATION AND A PORTABLE RECEIVING APPARATUS COMPRISING A SETELLITE POSITION-MEASURING SYSTEM are hereby incorporated herein by reference as if fully set forth.

SUMMARY OF THE INVENTION

This application is based on an original application No. 9/162202 filed in Japan on Jun. 19, 1997, the subject matter of which is hereby incorporated by reference as if fully set forth herein.

Given this background, it is an object of the present invention to provide a survey apparatus in which an angle and distance measuring apparatus having a built-in microcomputer is combined with a GPS survey machine, such that when observation data is collected and recorded using the angle and distance measuring apparatus, the coordinates of the position of the survey apparatus, as measured in real time by the GPS survey machine are recorded in the microcomputer so as to specify the installation position associated with the observation data.

The survey apparatus uses the values of the coordinates of the survey apparatus as determined by the GPS survey machine as installation point information to create and store the observation data. When previously stored observation data are retrieved and analyzed, the installation position of the survey apparatus can be easily confirmed. In creating and recording the observation data whose installation point information is provided by the values of the coordinates of the position of the survey apparatus, it is desirable that the survey apparatus record the coordinates of the position of the survey apparatus as its survey point name.

In this way, the survey apparatus, which records the coordinates of the position of the survey apparatus as its survey point name, can share the structure and content of observation data with a conventional angle and distance measuring apparatus. In addition, according to the present invention, the survey apparatus is a combination of an angle and distance measuring apparatus having a built-in microcomputer and a GPS survey machine. The built-in microcomputer stores the coordinates of the position of each of survey points in accordance with a prescribed work sequence. The survey apparatus then examines whether the coordinates of the installation position that the GPS survey machine has measured agrees with the coordinates of the installation position recorded in the microcomputer within an admissible range of error. If the coordinates of the installation position that the GPS survey machine has measured do not agree with the coordinates of the installation position recorded in the microcomputer within an admissible range of error, the survey apparatus generates a warning.

Thus, when the survey apparatus is installed at a wrong survey point, the survey apparatus can immediately notify the workers of the error. In addition, it is desirable that the survey apparatus calculate the amount of any discrepancy between the coordinates of the installation position that the GPS survey machine has measured and those recorded in the microcomputer and display the direction and distance to the coordinates recorded in the microcomputer.

Thus, when the survey apparatus is installed at a wrong site, the survey apparatus, which displays the difference between the coordinates of the installation position that the GPS survey machine has measured and recorded in the microcomputer, can easily notify workers of the correct installation site that is designated by the work plan.

According to the present invention, the survey apparatus, which is a combination of an angle and distance measuring apparatus having a built-in microcomputer and a GPS survey machine, reads in the file name of received data, which the GPS survey machine stores, as the installation point information on the observation data that is generated and recorded during the survey.

Thus, in retrieving and analyzing the observation data, the survey apparatus, which creates and stores the observation data using the file name for storing the data received by the GPS survey machine as the installation point information, can easily confirm the installation position of the survey apparatus by separately analyzing the GPS survey data. In addition, it is desirable that the survey apparatus store the file name as the survey point name by reading in the file name of the received data that the GPS survey machine stores as the survey point name.

Thus, the survey apparatus, which stores the coordinates of the survey apparatus as the survey point name, can share the structure and content of the observation data with the conventional angle and distance measuring apparatus. The survey apparatus can thus easily confirm its installation position by separately analyzing the GPS survey data whose file name is the survey point name. The present invention combines a GPS survey machine with an angle and distance measuring apparatus having a built-in microcomputer to which a GPS antenna is attached forming a survey apparatus.

The present invention provides a method for obtaining and storing the observation data. The method is carried out as follows. When this survey apparatus is installed at a survey point, the GPS survey machine positions the installation coordinates of the survey apparatus. The coordinate values determined by the GPS survey machine are then stored as the survey point name of the survey apparatus in the angle and distance measuring apparatus.

According to this survey method in which the file name of the data received by the GPS survey machine is recorded in the angle and distance measuring apparatus as the survey point name of the installation position of the angle and distance measuring apparatus, when this angle and distance measuring apparatus analyzes the observation data, the survey result can be obtained by precisely determining the installation point. Before carrying out the survey work, the coordinate values of the survey points are arranged in accordance with the work sequence and are stored in the microcomputer of the angle and distance measuring apparatus. When this survey apparatus has been installed, the values of the coordinates of the survey apparatus that the GPS survey machine has positioned are compared with those stored in the microcomputer. If the values of the coordinates the GPS survey machine has are not approximate values of those stored in the microcomputer, the angle and distance measuring apparatus displays a warning on its display screen or generates an alarm sound.

Thus, according to this method, the survey apparatus can be prevented from being installed at a wrong position. As a result, the correct survey work can be carried out in accordance with the observation plan.

When the discrepancy between the values of the coordinates obtained by the GPS survey machine and those stored in the microcomputer exceeds the admissible range of error, it is desirable that the direction and distance from the wrong installation position to the correct coordinate position recorded in the microcomputer be displayed on the display screen of the angle and distance measuring apparatus based on the discrepancy between the two coordinates.

Thus, by displaying the direction and distance from the wrong installation position to the correct coordinate position recorded in the microcomputer on the display screen of the angle and distance measuring apparatus, workers can immediately find the correct installation site.

According to the present invention, a GPS survey machine is combined with an angle and distance measuring apparatus, having a built-in microcomputer to which a GPS antenna is attached forming the survey apparatus. When this survey apparatus is installed at a survey point, the GPS survey machine positions the installation coordinates of the survey apparatus and stores the GPS survey data. When the site is surveyed using the angle and distance measuring apparatus and the observation data is recorded, and the survey point name of the observation data is input in the microcomputer, the file name of the file containing the GPS survey data is recorded in the angle and distance measuring apparatus as the survey point name. In this way, the present invention provides a method for obtaining and storing the observation data.

Thus, according to this survey method, in which the file name of the data received by the GPS survey machine is recorded in the angle and distance measuring apparatus as the survey point name of the installation position of the angle and distance measuring apparatus, the correct position to install the survey apparatus can be obtained by separately analyzing the GPS survey data after the survey work is completed. When the observation data obtained by this angle and distance measuring apparatus is analyzed, the survey result can be obtained by precisely determining the installation point.

According to the present invention, a file is created, and the coordinates of the position of the survey apparatus that the GPS survey machine has measured and calculated are used as the name of the file. In this case, the observation data obtained from a survey using the angle and distance measuring apparatus is stored in this file. Thus, by creating a file for storing the observation data whose file name is the coordinates of the position of the survey apparatus that the GPS survey machine measured and by recording in this data file the observation data obtained by the collimation survey using the angle and distance measuring apparatus, a survey result can be obtained from the coordinates of each of the survey points based on the survey plan.

Further, according to the present invention, when a GPS antenna is attached to an angle and distance measuring apparatus containing a microcomputer, whereby forming a survey apparatus by combining a GPS survey machine and the angle and distance measuring apparatus, installing this survey apparatus at a survey point and storing the survey point name in the angle and distance measuring apparatus, a data file can be created in the GPS survey machine using this survey point name as the name of the file, and the received data may be stored in this data file.

Thus, in storing the survey point name in the angle and distance measuring apparatus, since a data file whose file name is the survey point name is created and the received data is stored in the data file, the coordinates of the observed survey point can be confirmed using this survey point name by calculating the coordinates based on the received data.

DETAILED DESCRIPTION OF THE INVENTION

Figure 2:
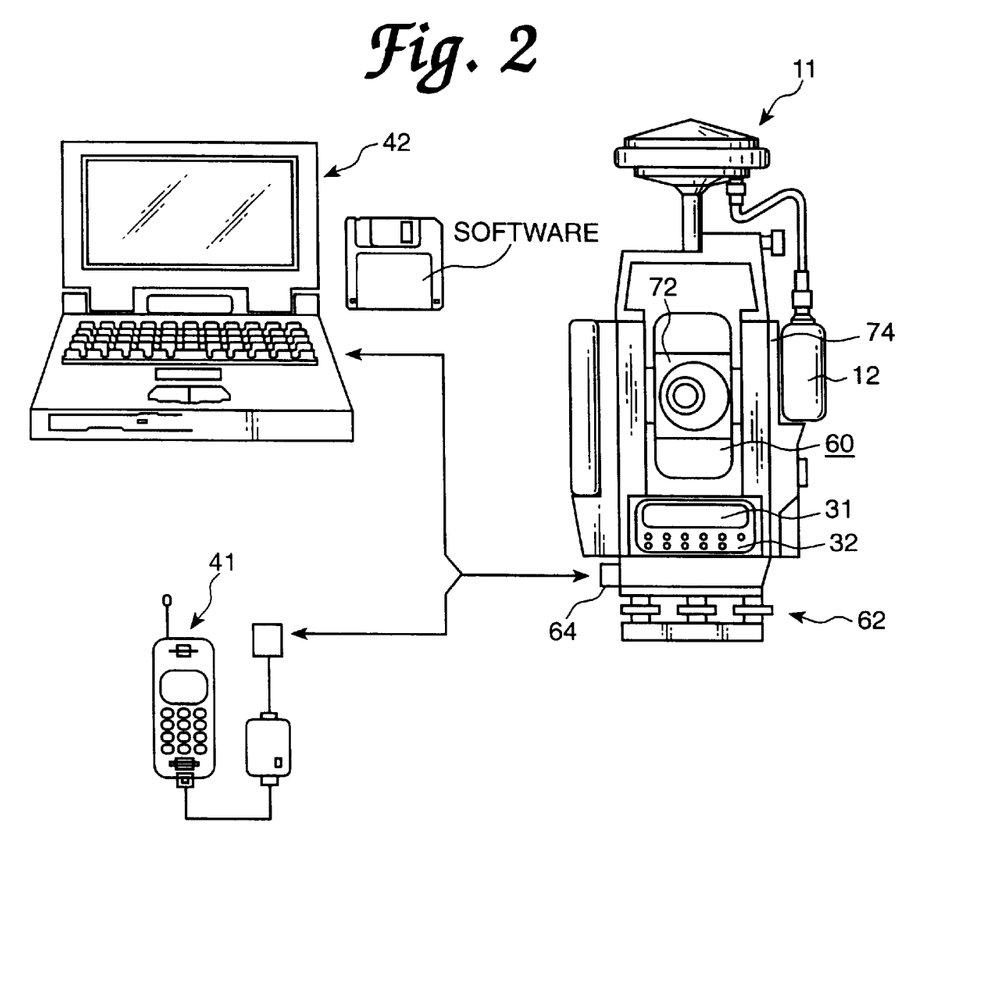
FIG. 2 shows an example of the external appearance of the survey apparatus according to the present invention.

As shown in FIG. 2, an embodiment of a survey apparatus according to the present invention is a survey apparatus in which a total station 60, a GPS antenna 11, and a GPS receiver 12 are combined. In installing this survey apparatus at a survey point, a base table is first leveled using a leveling table 62. The total station 60 is then installed over the survey point using a tripod (not shown) or the like. The GPS antenna 11 and GPS receiver 12 are then attached and fixed on the total station 60.

In addition, a bottom board connector 64 is installed on the base table so that a personal computer 42 can be connected to the base table. A wireless apparatus 41, such as a cellular phone, can also be connected to this bottom board connector via a modem. The main body of the total station 60 can be rotated horizontally on the base table around a horizontal direction rotation axis. Further, a keyboard 32 and a display unit 31 such as a liquid crystal display apparatus, are installed at the bottom of the main body of the total station 60. A vertical direction rotation axis is installed along a horizontal direction in the upper central portion of the main body of the total station. A collimation telescope 72 is installed in the upper central portion of the main body of the total station 60. The collimation telescope 72 can be rotated vertically around this vertical direction rotation axis. The GPS antenna 11 is fixed with screws or the like on this collimation telescope 72. The GPS receiver 12 is installed on one of the two sides of the main body 74 of the total station 60. The GPS receiver can be freely removed from or reinstalled on the main body 74 of the total station 60.

Figure 1:
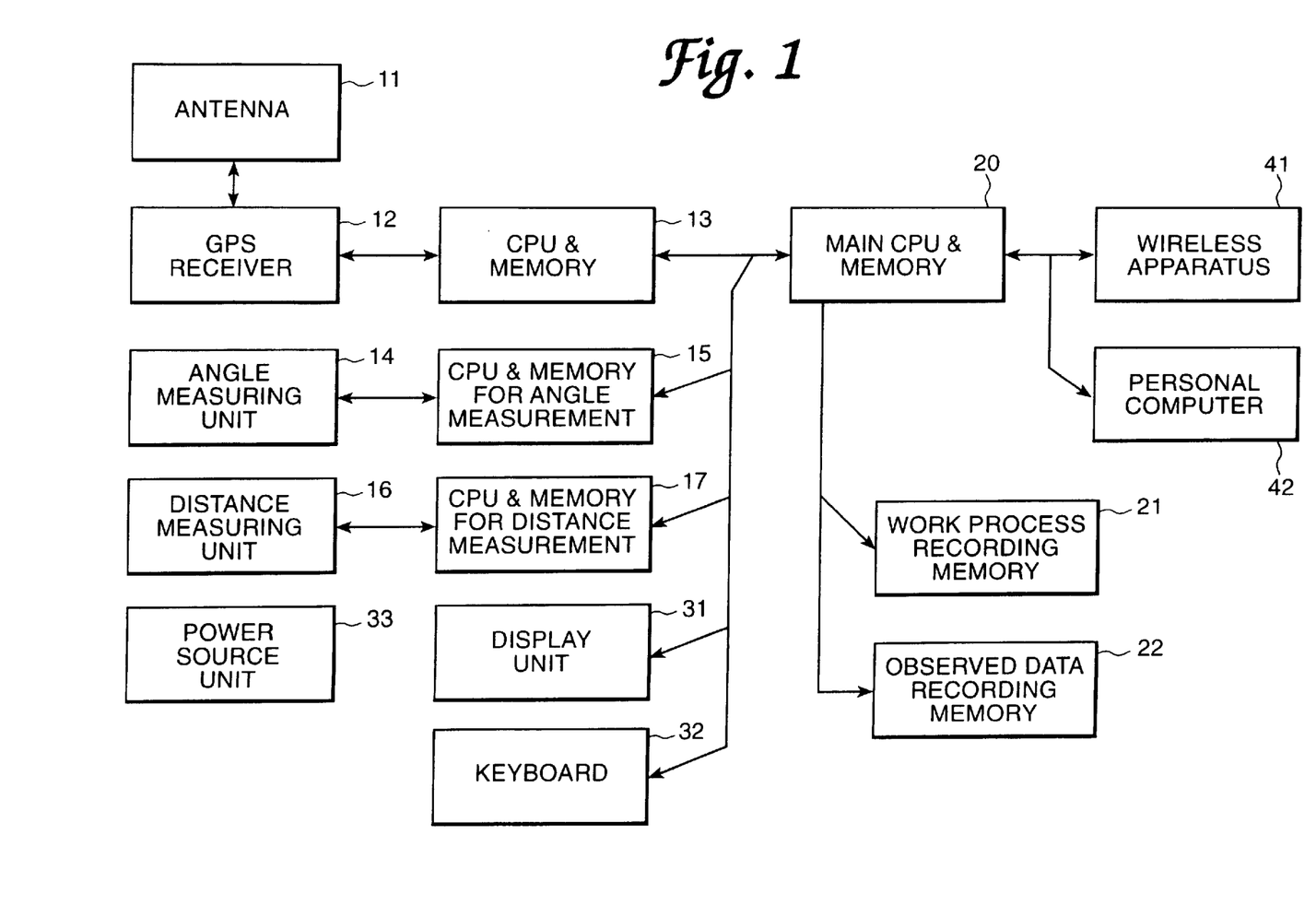
FIG. 1 is a block diagram showing the structure of a survey apparatus according to the present invention.

In installing the GPS antenna 11, the phase center of the GPS antenna is positioned along the horizontal direction rotation axis. This total station 60 has a main microcomputer 20 including a CPU, a memory for the main CPU, and several sub-microcomputers 13, 15, and 17. Each of the several sub-microcomputers includes a CPU and associated memory, and performs a specific function. As shown in FIG. 1, a GPS microcomputer 13 containing a sub-CPU and a memory is connected to GPS receiver 12, an angle measuring microcomputer 15 containing a CPU and memory connected to an angle measuring unit 14, and a distance measuring microcomputer 17 containing a CPU and a memory connected to a distance measuring unit 16. These microcomputers are also built in the total station together with main microcomputer 20.

Therefore, the survey apparatus according to the present embodiment is constituted by the total station 60, which serves as an angle and distance measuring apparatus, a GPS antenna 11, the GPS receiver 12, and the GPS microcomputer 13. The total station 60 includes the main microcomputer 20, and multiple microcomputers and memories for the microcomputers which the main microcomputer 20 controls. In response to data that is input from keyboard 32 that is installed on the main body of the total station 60, observation data, items of the work process, and the like are displayed on the display screen of display unit 31.

In addition, a work process recording memory 21 and an observation data recording memory 22 are installed as memory areas in total station 60. Through these memory areas, data can be exchanged between the total station 60 and personal computer 42 or wireless apparatus 41. The personal computer 42 and the wireless apparatus 41, which are external machines, are connected to the bottom board connector 64 via the main microcomputer 20. As an alternative, the work process recording memory 21 and/or the observed data recording memory 22 may be replaced by a memory card, which can be freely removed or installed.

The angle measuring unit 14 detects the horizontal direction rotation angle of the main body of the total station 60 with respect to the base table and the vertical direction rotation angle of the collimation telescope 72 by using a rotary encoder (not shown). The angle measuring microcomputer 15 calculates the exact values of these rotation angles based on signals supplied from the rotary encoder and creates angle data as in the conventional art. The distance measuring unit 16 can, for example, be a light wave distance measuring apparatus in which a high luminance LED or the like is used. The distance measuring unit 16 uses the distance measuring microcomputer 17 to calculate the exact distance from itself to a reflection point based on the time difference and phase difference between the emission beam and the reflection beam. The distance measuring unit 16 produces measurement data in this way as in the conventional art.

An electric power source 33 supplies electric power to each of the units and microcomputers and back-up voltage to each of the memories as needed. The GPS microcomputer 13 performs DGPS positioning and real time kinematic positioning based on data supplied from the other GPS survey machines.

The GPS receiver 12 receives electric power from the electric power source unit 33 of the total station 60, sharing the power source with the total station. As a result, the size of the GPS receiver 12 is reduced. In starting a survey work using this survey apparatus, a work process based on an observation execution plan is first transferred from a personal computer 42 to a work process recording memory 21.

In this work process, survey points at which the survey apparatus is to be installed are arranged in a sequence as data in accordance with the observation execution plan. The content of the data of this work process also contains the survey point names, survey point numbers, and sign numbers of the survey points. Each of these survey points is collimated from the other survey points. In making this work execution plan, required geographical information and control software are installed in the personal computer 42, which is an external machine. Approximate positions of known survey points and new survey points, which are needed for the survey work are determined based on the geographical information stored in the personal computer 42 so as to create an average plan diagram first. In creating this average plan diagram, as in the conventional art, new points and known points are selected to form a polygonal net that serves as an observation plan group. The polygonal net serves the same purpose and provides the same advantage as in the conventional art. Moreover, the known points and the new points are confirmed by investigating the sites, and required survey signs are installed at the known points and the new points as in the conventional art. Points to survey are selected and determined based on the site investigation. These points to survey are plotted on the topographical map so as to form a selected point diagram. The selected point diagram is modified based on the average plan diagram taking advantage of the polygonal net so as to create an average diagram. Combinations of sessions, offset points and the like are added on the average diagram to form an execution plan diagram. As part of the work process, the positions of survey points at which the survey apparatus are to be installed in accordance with the sequence given by the observation process and points to collimate from these survey points are determined as in the conventional art also.

Since the work process recording memory 21 is installed in this survey apparatus, the procedure and contents of the work process created in an external machine can be stored in the work process recording memory 21. Therefore, in conducting survey work on the site, the work contents can be displayed sequentially on the display screen of the display unit 31 by manipulating the keys of keyboard 32. In this way, in conducting a required observation at each of the survey points the installation position of the survey apparatus and the positions of the required collimation points can be confirmed.

Moreover, in starting the survey work, if other GPS survey machines are installed at the known points, and if the data obtained by the GPS survey machines installed at the known points are collected by connecting the wireless apparatus 41, which is an external machine, to this survey apparatus, then the coordinates of the current position of this survey apparatus can be confirmed by real time using RTK or DGPS. As in the conventional art, the observation data including the work name, machine type of the survey apparatus, machine number, names of the observers, date, month and year of the observation, weather, wind force, temperature, atmospheric pressure, survey point name, remarks, installation height of the survey apparatus, offset direction, offset distance, pair count, set number, direction number, start time, end time, names of the collimation points, height of the object, observation number, observed value of the horizontal angle, observed value of the vertical angle, and measure value of the oblique distance is stored in the observation data recording memory 22.

In inputting this data, the work name, machine type of the survey apparatus, machine number, names of the observers, date, month and year of the observation, weather, wind force, temperature and atmospheric pressure are first input manually from the keyboard 32. In this case, the work name may be transferred from the work process recording memory 21 to the observation data recording memory 22. When the data on the work process stored in the work process recording memory 21 does not contain the work name, the work name is input manually from the keyboard 32 to the observation data recording memory 22. The data on the machine type and machine number is pre-registered in the memory of the main microcomputer 20 and is transferred to the observation data recording memory 22. The names of the observers, date, month and year of the observation, weather, and the like are input from the keyboard 32 to the observation data recording memory 22 as needed.

In inputting the survey point name, it is not manually typed on the keyboard 32 as in the conventional art, but the values of the coordinates of the survey point are transferred as a survey point name from the memory of the GPS microcomputer 13 to the observation data recording memory 22 and are recorded in the observation data recording memory 22 via a key operation on the keyboard 32. These coordinates includes the longitude and latitude the GPS survey machine has obtained. The height of the reference ellipsoid or the altitude with respect to the geoid surface are also included in these coordinates as needed.

In starting a GPS survey after the survey apparatus has been installed when a file for storing the received data is created using the survey point name as the file name, the file name of the GPS received data can be transferred as the survey point name to the observation data recording memory 22 and recorded in the observation data recording memory 22 by a key operation on the keyboard 32. The remarks such as the sign numbers, height of the machine, offset data and the like are input manually from the keyboard 32, and are stored in the observation data recording memory 22.

The pair number, set number, start time, collimation point name, object height, observation number and the like are also sequentially input manually from the keyboard 32, and are stored in the observation data recording memory 22. After a collimation point has been collimated, the observed values of the horizontal angle and vertical angle are transferred from the memory of the angle measuring microcomputer 15 to the observation data recording memory 22 by a key operation on the keyboard. The measured value of the oblique distance is transferred from the memory of the distance measuring microcomputer 17 to the observation data recording memory 22 and is stored in the observation data recording memory 22.

After this, this collimation point is collimated by the number of times determined by the pair number. The observed values of the horizontal angle, vertical angle, and oblique distance are stored in the observation data recording memory 22. The name of the next collimation point, the height of the next object, and the next observation number are then input manually and stored in the observation data recording memory 22. Subsequently, the observed values of the horizontal angle and vertical angle are transferred from the memory of the angle measuring microcomputer 15 to the observation data recording memory 22 by a key operation on the keyboard 32. The measured value of the oblique distance is then transferred from the memory of the distance measuring microcomputer 17 to the observation data recording memory 22 and is stored in the observation data recording memory 22.

When the survey apparatus has been moved to a new survey point, the coordinates that GPS survey machine has obtained are transferred from the memory of the GPS microcomputer 13 to the observation data recording memory 22. The coordinates are then stored in the observation data recording memory 22 as the survey point name of the new survey point. Similarly, the observed values of the horizontal angle and vertical angle are transferred from the memory of the angle measuring microcomputer 15 to the observation data recording memory 22 by operating keyboard 32. The measured value of the oblique distance is then transferred from the memory of the distance measuring microcomputer 17 to the observation data recording memory 22 and is stored in the observation data recording memory 22. The end time is input manually from the keyboard 32 at the end of the observation.

Thus, according to the present embodiment, the GPS antenna 11 is attached to the total station 60, positioning the phase center of the GPS antenna 11 along the horizontal direction rotation axis, the GPS receiver 12 and the GPS microcomputer 13 are installed on and in the total station 60, respectively, whereby combining the total station 60 and the GPS survey machine to constitute the survey apparatus. The observation data including the coordinates of the survey apparatus are obtained via the GPS survey machine and the observed data is recorded in the observation data recording memory 22. The survey point name is not manually typed on the keyboard 32. Instead, the coordinate values of the survey point are transferred as the survey point name from the memory of the GPS microcomputer 13 to the observation data recording memory 22 and the survey point name is recorded in the observation data recording memory 22. This process is carried out by a key operation on the keyboard 32.

Therefore, according to the present embodiment, no error occurs in inputting the survey point name as in the conventional art. As a result, the observation data collected from each of the survey points can be analyzed correctly, and a correct survey result can be obtained.

In using the values of the coordinates, obtained by the GPS survey machine, as observation data, transferring the values of the coordinates as the survey point name to the observation data recording memory 22 is not the only option. As an alternative, the survey point name is input manually from the keyboard 32, and the values of the coordinates obtained by the GPS survey machine are recorded as remarks in the observation data recording memory 22. In this case, the values of the coordinates the GPS survey machine has calculated can be used to confirm the survey name even when the calculated coordinate value contains an error to some extent, and the accuracy of the survey is prevented from getting deteriorated.

As part of the observation execution plan, when the latitude, longitude, and height of each survey point and the sign number of the survey point are incorporated in the work process together with the survey point name, the coordinate values of the latitude, longitude, and height of each survey point, and the like may be stored in the work process recording memory 21 in accordance with the work sequence. In this case, when the main microcomputer 20 has read in the measured coordinate values from the GPS microcomputer 13, the main microcomputer 20 searches for coordinate values that correspond to the measured coordinate values in the work process recording memory 21. The main microcomputer 20 then transfers the survey point name and sign number assigned to these coordinate values from the work process recording memory 21 to the observation data recording memory 22.

When the coordinate data that the main microcomputer 20 has read in from the GPS microcomputer 13 is not saved in the work process recording memory 21, the display screen of the display unit 31 flashes an error sign. This error sign indicates that the survey apparatus has been installed at a wrong position. In this case, if the total station 60 is equipped with a sound device, an audible warning may be generated.

When the main microcomputer 20 compares the coordinate values, which the GPS survey machine has measured, with the coordinate values stored in the work process recording memory 21 in accordance with the work sequence, if the measured coordinate values deviate from the stored coordinate values, the main microcomputer 20 calculates the discrepancy between the measured coordinate values and the stored coordinate values. The direction and distance from the wrong survey point position to the correct survey point position are then displayed on the display screen.

When the coordinates, which the GPS survey machine has measured, are compared with the coordinates stored in the work process recording memory 21, and the degree of agreement between them is examined and detected, an admissible range of error within several ten centimeters is determined. In this way, coordinates that agree with the GPS-measured coordinates are searched for. In the case in which survey point names, coordinates and sign numbers are recorded as work process data in accordance with the survey work sequence in the work process recording memory 21, when an observation at one survey point has been completed, the direction and distance from the survey point to the next survey point, at which the survey apparatus is to be installed, can be displayed on the display screen by a key operation on the keyboard 32.

In this way, by recording the coordinates of the survey point in the work process recording memory 21, comparing the coordinates the GPS survey machine has measured with the recorded coordinates, transferring the survey point name from the work process recording memory 21 to the observation data recording memory 22, recording the survey name as observation data in the observation data recording memory 22, and displaying a warning in the case in which the coordinates the GPS survey machine has measured do not agree with the recorded coordinate, a human error that might occur in manually inputting the survey point name can be prevented. Thus, the survey apparatus is prevented from being installed at a wrong position.

In addition, by displaying the correct direction and distance from the current survey point to the next survey point at which the survey apparatus is to be installed, the workers can quickly find the location of the next installation site. In this way, the survey work can be performed efficiently. When the survey apparatus has been moved to a new survey point, a new file for storing the received data is created in the memory of the GPS microcomputer 13. A new name is then given to this file. This file name is transferred to the observation data recording memory 22 where the file name is stored as the name of the new survey point. Similarly, the observed values of the horizontal angle, vertical angle and oblique distance, which have been obtained by collimation are manually input from the keyboard 32 and are recorded in the observation data recording memory 22. At the end of the observation, the end time is typed from the keyboard 32. Thus, according to the present embodiment, the main microcomputer 20 is used as a read-in means. In other words, the main microcomputer 20 transfers the file name of the received data from the GPS microcomputer 13 to the observation data recording memory 22, and records the file name of the received data which the GPS survey machine has obtained, as the survey point name. After the survey work has been completed, the GPS survey data designated by the file name is analyzed and the coordinates of the survey point are calculated. The observation data having the same survey point name is then analyzed so as to obtain the result of the survey. In the case in which the survey point name differs from the survey point name listed in the observation execution plan, the coordinates of the correct survey point are calculated by analyzing the data received from the GPS survey machine, since the file name of this GPS survey data is the same as the survey point name recorded in the observed data. Based on the calculated coordinates, the coordinates of the position of the correct survey point are confirmed. As a result, the correct survey result can be obtained.

In having the main microcomputer 20 transfer the file name of the received data as the survey point name from the GPS microcomputer 13 to the observation data recording memory 22, the file name can be read in as a remark on the survey point. In this case, the file name is recorded in the observation data recording memory 22. In having this survey apparatus record the observed data in the observation data recording memory 22, as an alternative, several data files can be created for each of the survey points at which the survey apparatus is to be installed. In this case, the observed data is split among the several data files instead of storing a series of data from all the survey points in one file ranging from the work name, observed values, measured values and to the end times.

In this case, the coordinates of each of the survey points that the main microcomputer 20 has read in from the GPS microcomputer 13 are used as the name of the observed data file for each of the survey points. Each of these file names is then recorded in the observation data recording memory 22. Therefore, even in the case in which data having a wrong survey point name is input from the keyboard 32 into the data file, when the observed data is analyzed by calculation, the correct coordinates recorded on the work plan are used for data analysis. The several files are collected using the file names designated by the coordinate values. In this way, the entire observed data can be collected, which is to be used to perform the correct data analysis calculation.

Alternatively, in creating several observed data files, the name of the file containing the received data on the respective survey point the GPS survey machine has obtained can be read in, using the respective file name as the name of each of the observed data files. In this case also, the received data is analyzed sequentially in accordance with the file names designated by the coordinate values. The coordinates of each of the survey points for which each of the files has been created is then confirmed based on the analyzed received data. The respective coordinates are attached to the observed data having the same file name. In this way, the survey result can be obtained.

In recording a survey point name in the observation data recording memory 22 by typing the survey name on the keyboard 32 as an alternative, this survey point name can be transferred to the memory of the GPS microcomputer 13. In this case, the survey point name is recorded as the name of the received data file that has been created in the GPS microcomputer 13. As an another alternative, several files can be created in the memory of the GPS microcomputer 13 attaching each of the survey point name which is to be stored in the observation data recording memory 22 to the respective file as its file name. Once these files have been created, the memory of the GPS microcomputer 13 starts recording the received data.

In this case also, the name of the file containing the GPS survey data is the same as the name of the respective survey point at which the observation data has been collected. Hence, after the survey has been completed, another computer, in which after-process software and the like are installed, analyzes the received data that is stored in the file that has been created in the memory of the GPS microcomputer 13. This computer then calculates the coordinates of the respective survey point based on the analyzed data. In this way, the coordinates of the respective survey point can be confirmed. Moreover, when the observed data associated with this survey point name is analyzed and calculated, the calculated coordinates can be used to confirm the position of the observation site.

Figure 3:
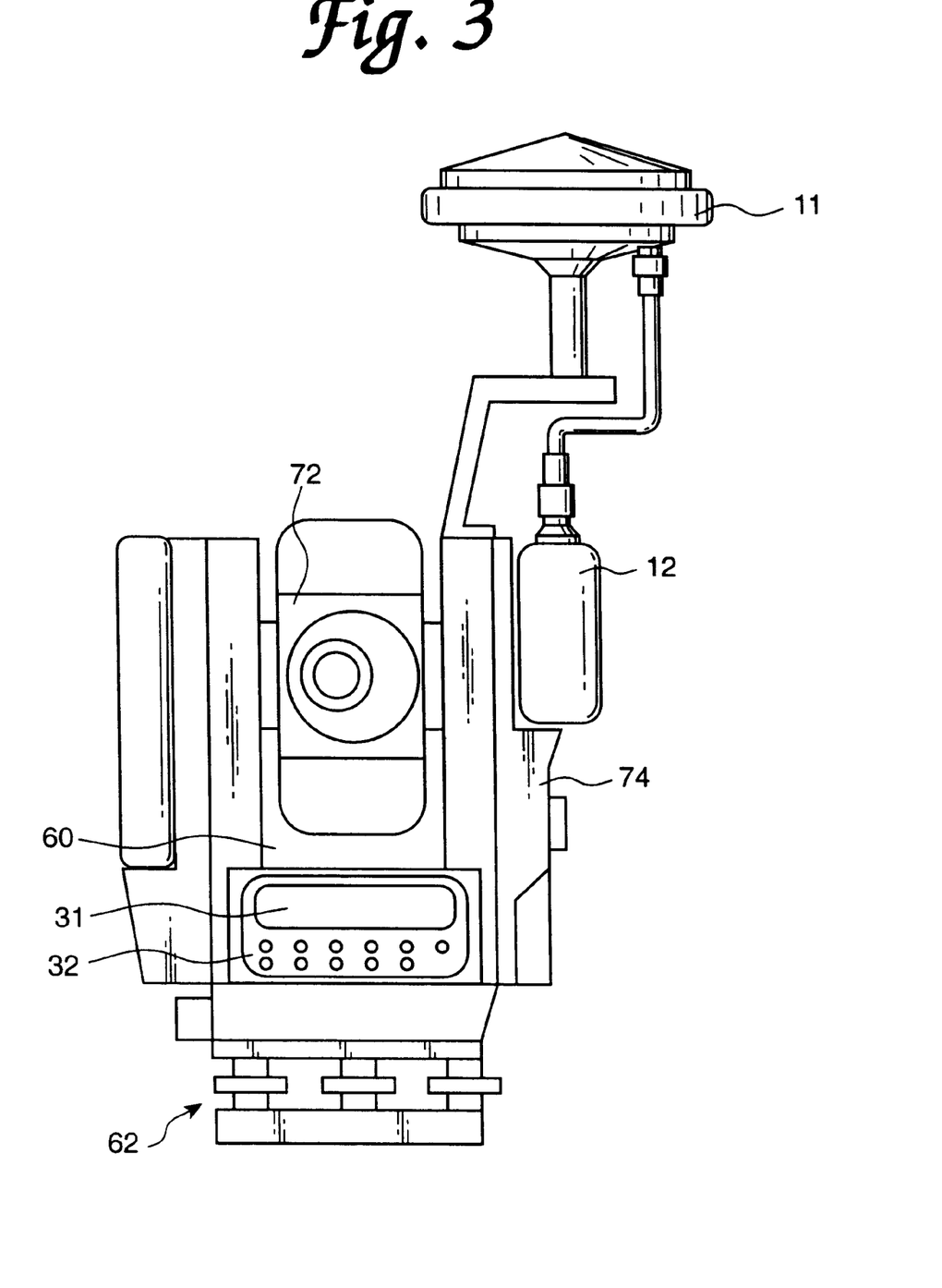
FIG. 3 is an example of an alternative embodiment of the external appearance of the survey apparatus according to the present invention.

Therefore, in this case, the coordinates obtained by the GPS survey are used as the name of the file storing the observation data. This file name is used as the installation information so as to confirm the installation position. As a result, the survey result becomes highly reliable. It is to be noted again that the phase center of the GPS antenna 11 of the above-described survey apparatus is fixed along the horizontal direction rotation axis of the total station 60. However, as shown in FIG. 3, the GPS antenna 11 may be installed on the upper portion of one of the two sides of the main body of the total station.

In this case, an azimuth angle sensor is installed in the total station 60. The offset amount between the phase center of antenna 11 and the horizontal direction rotation axis of the total station 60 is then recorded in the GPS microcomputer 13. The values of the coordinates of the horizontal direction rotation axis are calculated based on the offset direction the azimuth angle sensor detects and are corrected from the position of the GPS antenna 11. As a result, the installation coordinates of the survey apparatus can be obtained by the GPS survey. As in the embodiment described before, the values of the coordinates of the horizontal direction rotation axis can be used as the coordinates of the survey apparatus.

According to a first aspect of the present invention, an angle and distance measuring apparatus having a built-in microcomputer is combined with a GPS survey machine so as to form a survey apparatus. The GPS survey machine measures the position of the survey apparatus by real time and obtains the values of the coordinate of the position of the survey apparatus. The angle and distance measuring apparatus creates and stores the observation data in performing a survey work. The microcomputer then stores the values of the measured coordinates as installation point information for observation data.

Therefore, whenever the observation data is analyzed, the installation point of the survey apparatus can be confirmed. In addition, the survey result can be easily evaluated and judged. As a result, the survey result becomes highly reliable.

According to a second aspect of the present invention, the microcomputer of the survey apparatus stores the values of the coordinates as the survey point name when the observation data is created and recorded as installation point information.

Therefore, a human error that might occur in manually inputting the survey point name can be prevented, and the survey result becomes highly reliable.

According to a third aspect of the present invention, the microcomputer stores the coordinate values of each of the survey points in accordance with a work sequence. When the GPS survey machine has measured the coordinates of the installation point, the survey apparatus judges whether the values of the coordinates the GPS survey machine has measured agree with the values of the coordinates stored in the microcomputer. The survey apparatus generates a warning when the values of the coordinates the GPS survey machine has measured do not agree with the values of the coordinates stored in the microcomputer within an admissible range.

Therefore, when the survey apparatus has been installed at a wrong position, the workers are immediately notified of the error, thereby preventing unnecessary survey work. As a result, based on the correct observation data, a highly reliable survey result can be produced.

According to a fourth aspect of the present invention, the survey apparatus calculates the discrepancy between the values of the coordinates the GPS survey machine has measured and the values of the coordinates stored in the microcomputer. The survey apparatus then displays the direction and distance from the coordinates the GPS survey machine has measured to the coordinates stored in the microcomputer.

Therefore, when the survey apparatus has been installed at a wrong position, the workers are notified of the error, thereby preventing unnecessary survey work. As a result, based on the correct observation data, a highly reliable survey result can be produced.

According to a fifth aspect of the present invention, an angle and distance measuring apparatus having a built-in microcomputer is combined with a GPS survey machine so as to form a survey apparatus. The GPS survey machine has a file for storing received data. This file is given a name. The built-in microcomputer stores the file name as installation point information for observation data that is created and recorded when a survey work is conducted using the angle and distance measuring apparatus.

Therefore, by analyzing the received data obtained by the GPS survey, the correct coordinates can be specified for each file name. These coordinates are replaced by the installation position information associated with these coordinates. Thus, whenever the observation data is analyzed, the installation point can be confirmed. In addition, the survey result can be evaluated and judged easily. As a result, a highly reliable survey result can be produced.

According to a sixth aspect of the present invention, when the observation data is created and stored using the file name of the received data that the GPS survey machine stores as installation point information, the built-in microcomputer stores the file name as the survey point name. Therefore, a human error that might occur in inputting the survey point name can be prevented. Moreover, by analyzing the received data, the coordinates of the position of the survey point to which the name of the correct survey point is attached can be obtained. As a result, a highly reliable survey result can be produced.

According to a seventh aspect of the present invention, a first effective survey method is provided. The first survey method is carried out as follows. An angle and distance measuring apparatus having a built-in microcomputer is combined with a GPS survey machine so as to form a survey apparatus. The survey apparatus is first installed at a survey point. The GPS survey machine then measures the coordinates of the survey point. The survey apparatus is installed at this survey point. The coordinates are then used as the name of the survey point. The name of the survey point is then stored in the angle and distance measuring apparatus. Subsequently, observation data is obtained. The observation data is then stored in the microcomputer. Therefore, a human error that might occur in inputting the survey point name can be prevented, and the survey result becomes highly reliable.

According to an eighth aspect of the present invention, a second effective survey method is provided. The second survey method is carried out as follows. An angle and distance measuring apparatus having a built-in microcomputer is combined with a GPS survey machine so as to form a survey apparatus. The microcomputer arranges the values of the coordinates of survey points in accordance with a prescribed work sequence before the survey work is started. The microcomputer then stores the values of the coordinates of the survey points. Next, one of the survey points is selected. The survey apparatus is installed at the selected survey point. The values of the coordinates of the selected survey point, which the GPS survey machine has measured, are compared with the values of the coordinates of the selected survey point stored in the microcomputer. When the values of the coordinates of the selected survey point which the GPS survey machine has measured are not approximate values of the values of the coordinates of the selected survey point stored in the microcomputer, the survey apparatus displays a warning sign on the display screen of the angle and distance measuring apparatus or generates a warning sound using a sound generating means installed in the angle and distance measuring apparatus.

Therefore, when the survey apparatus has been installed at a wrong position, the workers are immediately notified of the error thereby preventing unnecessary survey work. As a result, based on the correct observation data, a highly reliable survey result can be produced.

According to a ninth aspect of the present invention, a third effective survey method is provided. The third survey method is carried out as follows. When the discrepancy between the values of the coordinates of the position of the selected survey point which the GPS survey machine has measured and the values of the coordinates of the position of the selected survey point stored in the microcomputer has exceeded an admissible range of error, the direction and distance from the coordinates of the position of the selected survey point which GPS survey machine has measured to the coordinates of the position of the selected survey point stored in the microcomputer are displayed on the display screen of the angle and distance measuring apparatus.

Therefore, when the survey apparatus has been installed at a wrong position, the workers are immediately notified of the error, thereby preventing unnecessary survey work. As a result, based on the correct observation data, a highly reliable survey result can be produced.

What is claimed is:

1. A survey method comprising:

installing a survey apparatus at a survey point, the survey apparatus including (i) an angle and distance measuring apparatus having a microcomputer and (ii) a global positioning system (GPS) survey machine;

using the microcomputer to (i) select predetermined coordinates of the survey point in accordance with a work sequence before a survey is started and (ii) store the predetermined coordinates;

using the GPS survey machine to measure coordinates defining a position of the survey point, thus producing measured coordinates, and using the measured coordinates as a name of the survey point;

comparing the stored predetermined coordinates with the measured coordinates;

displaying a warning sign on a display screen or generating a warning sound if the stored predetermined coordinates do not match the measured coordinates;

storing the name in the microcomputer;

obtaining observation data using the angle and distance measuring apparatus based upon the stored name; and storing the observation data in the microcomputer.

2. A survey method as claimed in claim 1, wherein direction and distance from the coordinate of the position of the selected survey point, which GPS survey machine has measured, to the coordinate of the position of the selected survey point stored in the microcomputer are displayed on the display screen of the angle and distance measuring apparatus, if a discrepancy between the values of the coordinate of the position of the selected survey point, which the GPS survey machine has measured, and the values of the coordinate of the position of the selected survey point stored in the microcomputer has exceeded an admissible range of error, based on the discrepancy between the two coordinates.

3. A survey method as claimed in claim 1, wherein direction and distance from the coordinate of the position of the selected survey point, which GPS survey machine has measured, to the coordinate of the position of the selected survey point stored in the microcomputer are displayed on the display screen of the angle and distance measuring apparatus, if a discrepancy between the values of the coordinate of the position of the selected survey point, which the GPS survey machine has measured, and the values of the coordinate of the position of the selected survey point stored in the microcomputer has exceeded an admissible range of error, based on the discrepancy between the two coordinates.

4. A survey apparatus comprising:

an angle and distance measuring apparatus for measuring angles and distance from a survey point, the angle and distance measuring apparatus having a microcomputer storing predetermined coordinates of a position of the survey apparatus installed at the survey point, storing the predetermined coordinates in accordance with a work sequence; and a global positioning system survey machine for measuring the position of the survey apparatus in real time, obtaining measured coordinates of the position of the survey apparatus thereby;

wherein the survey apparatus (i) determines whether the measured coordinates match the stored coordinates when the global positioning system survey machine measures the coordinates and (ii) generates a warning if the measured coordinates do not match the stored coordinates.

5. A survey apparatus comprising:

an angle and distance measuring apparatus for measuring angles and distance from a survey point, the angle and distance measuring apparatus having a built-in microcomputer storing predetermined coordinates of a position of the survey apparatus installed at the survey point, storing the predetermined coordinates in accordance with a work sequence;

wherein the microcomputer stores the predetermined coordinates as a name of the survey point when the predetermined coordinates are stored; and a global positioning system survey machine for measuring the position of the survey apparatus in real time, producing measured coordinates of the position of the survey apparatus thereby;

wherein the survey apparatus (i) determines whether the measured coordinates match the stored coordinates when the global positioning system survey machine measures the coordinates and (ii) generates a warning if the measured coordinates do not match the stored coordinates.

6. A survey apparatus comprising:

an angle and distance measuring apparatus for measuring angles and distance from a survey point, the angle and distance measuring apparatus having a built-in microcomputer storing predetermined coordinates of a position of the survey apparatus installed at the survey point, storing the predetermined coordinates in accordance with a work sequence; and a global positioning system survey machine for measuring the position of the survey apparatus in real time, obtaining measured coordinates of the position of the survey apparatus thereby;

wherein the survey apparatus (i) determines whether the measured coordinates match the stored predetermined coordinates when the global positioning system survey machine measures the coordinates, (ii) generates a warning if the measured coordinates do not match the stored predetermined coordinates, (iii) calculates a discrepancy between the measured coordinates and the stored predetermined coordinates, and (iv) displays direction and distance from the measured coordinates to the stored predetermined coordinates.

7. A survey apparatus comprising:

an angle and distance measuring apparatus for measuring angles and distance from a survey point, the angle and distance measuring apparatus having a microcomputer storing a file name; and a global positioning survey machine storing received data as a named file, (i) the microcomputer storing the file name as installation point information for observation data and (ii) the angle and distance measuring apparatus using the observation data when conducting a survey work.

8. A survey apparatus as claimed in claim 7, wherein the observation data is created and stored using the file name of the received data and the microcomputer stores the file name as a survey point name.

* * * * *